United States Patent [19]

Newbold et al.

[11] 4,212,209
[45] Jul. 15, 1980

[54] DIFFERENTIAL PRESSURE TO ELECTRIC CURRENT TRANSDUCER EMPLOYING A STRAIN SENSITIVE RESISTIVE PATTERN ON A SUBSTRATE HAVING A HIGH MODULUS OF ELASTICITY

[75] Inventors: William F. Newbold, Philadelphia; Gurnam Singh, Willow Grove, both of Pa.

[73] Assignee: Honeywell Inc., Minneapolis, Minn.

[21] Appl. No.: 940,333

[22] Filed: Sep. 7, 1978

Related U.S. Application Data

[63] Continuation-in-part of Ser. No. 838,538, Oct. 3, 1977, abandoned.

[51] Int. Cl.³ ............................................. G01L 9/06
[52] U.S. Cl. .......................................... 73/721; 338/4; 338/42
[58] Field of Search ................. 73/720, 721, 726, 727, 73/141 A, 777; 338/4, 5, 36, 42, 47

[56] References Cited

U.S. PATENT DOCUMENTS

| 3,277,698 | 10/1966 | Mason | 73/777 |
| 3,417,322 | 12/1968 | Fenner | 73/777 |
| 3,780,588 | 12/1973 | Whitehead et al. | 73/721 |
| 3,970,982 | 7/1976 | Kurtz et al. | 338/4 |

Primary Examiner—Donald O. Woodiel
Attorney, Agent, or Firm—L. J. Marhoefer

[57] ABSTRACT

In a differential pressure to electric current transducer, a short sapphire slab carries a strain sensitive resistive pattern. The sapphire slab is an element of a much larger beam as the beam moves to change the stress of the other surfaces of the sapphire slab and varies the resistance of the silicon resistive pattern to produce an electric current signal indicative of the differential pressure.

5 Claims, 3 Drawing Figures

DIFFERENTIAL PRESSURE TO ELECTRIC CURRENT TRANSDUCER EMPLOYING A STRAIN SENSITIVE RESISTIVE PATTERN ON A SUBSTRATE HAVING A HIGH MODULUS OF ELASTICITY

CROSS REFERENCE

The present application is a continuation-in-part of application Ser. No. 838,538, filed on Oct. 3, 1977, now abandoned.

BACKGROUND OF THE INVENTION

1. Field of the Invention

This invention relates to a transducer for converting a differential pressure to an electric signal and more particularly to an improved transducer employing a strain sensitive semiconductor resistor on a substrate having a high modulus of elasticity. This improved transducer is simple in its construction; capable of operating at low differential pressures; and capable of operating at high temperatures and exposed to nuclear radiation.

Transducers of the general type taught by this invention are well known in the art. One example of such a prior art transducer is shown in U.S. Pat. No. 3,559,488; it employs a semiconductor beam or diaphragm as the sensing element. In this prior art transducer, which is typical of the transducers of the type generally contemplated by this invention, the resistance of resistors formed in outer surface of the semiconductor beam or diaphragm changes as the beam or diaphragm changes as the beam or diaphragm deflects in response to changes in pressure. This change in resistance produces a change in current flow, and the current signal may be calibrated in terms of the pressure.

Recently, there have been proposals to make differential pressure transducers employing a strain sensitive diaphragm comprised of a sapphire substrate onto the surface of which a silicon resistance pattern is formed. Such a combination has certain desirable qualities as a strain sensitive element particularly in environments such as high temperature environments and environments which include exposure to nuclear radiation. However, as will be appreciated by those skilled in the art, sapphire has a very high modulus of elasticity. Prior art proposals for transducer designs employing strain sensitive silicon on sapphire diaphragms have not proved entirely satisfactory particularly for low pressure applications.

The objects of this invention relate to a design for a transducer employing a silicon on sapphire strain sensitive element for use in low differential pressure applications. Specifically, the objects include a design which permits; (a) a relatively large movement of a pressure responsive element at low differential pressures; (b) simple overload protection; and (c) realistic manufacturing tolerances.

Briefly, this invention contemplates a transducer in which a short sapphire slab carries a silicon strain sensitive resistive pattern. The sapphire slab is an element of a much larger beam, one end of which is embedded in a header. A fluid filled capsule connected to the other end of the beam moves as the relative pressure of the fill fluid and the external pressure changes. As the beam moves, it changes the stress at the outer surfaces of the sapphire slab and varies the resistance of the silicon resistor to produce an electric signal.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
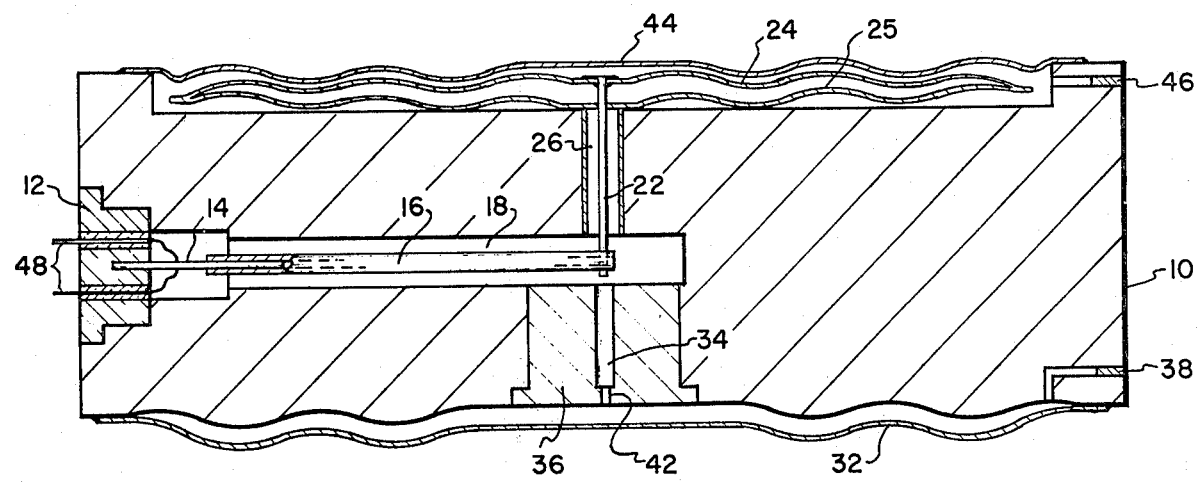
FIG. 1 is a side elevation, with certain parts broken away and certain parts shown in section, of a transducer in accordance with a preferred embodiment of the invention.

Referring to FIG. 1 of the drawings, a cylindrical block 10 supports the various transducer components mounted therein. On the left hand side of the block 10, there is a header 12 which supports a strain sensitive element 14 in a manner more fully described in connection with FIG. 2. A rigid tube 16 secured to element 14 extends to the center of the block 10 along a passageway 18.

A rod 22 attached (e.g., silver soldered) to one end of the tube 16 connects the tube to a capsule 24. The rod 22 is attached to the top of the capsule and passes freely through a port 25 in the bottom of the capsule. The capsule 24 is secure to the base 10 with the port 25 concentric with a passageway 26 through which the rod 22 extends.

A circular corrugated diaphragm 32 covers a recess in the other side of the block 10. A passageway 34 in a plug 36 provides a fluid connection between the space enclosed by the diaphragm 32 and the interior of the capsule 24.

In operation, the interior of the capsule 24, the passageways 26 and 34, the space between the diaphragm 33 and the housing 10, and the passageway 18 are filled with a suitable incompressible fluid. A fill hole 38 may be used for this purpose. The differences in pressures applied to the outer surface of diaphragm 38 and outer surface of capsule 24 determines the position of the end of the tube 16.

For example, as the external pressure applied to the surface of diaphragm 32 increases relative to the external pressure on capsule 34, the tube moves upwardly as viewed in FIG. 1. This alters the stress in strain sensitive element 14 and produces an electric current signal indicative of the pressure difference.

A restriction 42 in passageway 34 provides a damping action to limit the transducer response to perturbations in the fluid flow. A barrier diaphragm 44 may be employed, if desired, to protect the capsule 24 from corrosive fluids. If a diaphragm 44 is used, the space beneath the diaphragm is filled with an incompressible fluid. Port 46 may be used for this purpose.

Figure 2:
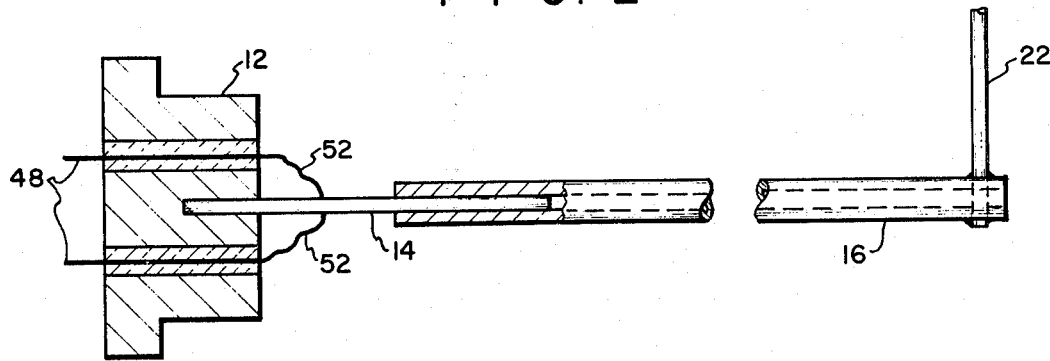
FIG. 2 is a detailed view of the strain sensitive element of FIG. 1 showing how it is secured to the header and to the beam extender.

Referring now to FIG. 2, the strain sensitive element 14 is embedded in the header 12. In the preferred embodiment of the invention, the strain sensitive element 14 is a single crystal sapphire Al$_2$O$_3$ approximately 33 millimeters thick, 8 millimeters long and 3 millimeters wide on the upper and lower surfaces of which silver resistance patterns are formed. These resistors may be formed by growing an epitaxial layer of silicon on the upper and the lower surface of the sapphire, diffusing impurities in a resistive bridge pattern into the silicon layers; and finally etching away the silicon in the regions except where the pattern is formed. It will be appreciated that this silicon on sapphire combination minimizes leakage current as compared to that found in conventional diffused silicon strain gauges. This is particularly the case at high temperatures and in ambient conditions which include large amounts of nuclear radiation.

In order to avoid overstressing the beam 14 at its point of attachment, it must be embedded a substantial distance into the header 12 and the tube 16. In a preferred embodiment of the invention, the overall beam length is approximately 40 times the beam thickness with the region embedded in the block 12 and tube 16 equal respectively to approximately 10 times the beam thickness. In this way, the stress exerted on the beam at its points of attachment to the header and tube will be much less than the surface stress in the beam itself. A suitable epoxy or even metal bond may be used for securing the beam to the header and to the tube.

The tube 16 is relatively stiff compared to the slab 14. In a preferred embodiment, a brass rod is used whose thickness is approximately 10 times the thickness of the beam 14. Importantly, the length of rod 16 between its point of attachment to slab 14 and its point of attachment to rod 22 should be sufficiently long so that the stress at the outer surface of the slab 14 is substantially uniform throughout the range of movement of the capsule 24. This permits a reasonable manufacturing tolerance in the position of the strain sensitive resistors relative to the face of the header 12. In order to achieve this desired result, the rod should be at least 8 times the length of the beam.

A number of conductive pins 48 (only two shown) and fine wire leads 52 conduct energizing and signal currents to the resistive pattern on the slab 14. The pins 48 are glass sealed in the header 12 to both insulate the pins from the header and to maintain the interior chambers of the transducer fluid tight.

Preferably, the header 12 is made of a material whose thermal coefficient of expansion matches the thermal coefficient of expansion of the beam 14. Nickel is suitable for use with sapphire.

In operation, the system is filled with a suitable non-compressible fluid so that a relative change in external diaphragm and capsule pressure cause movement of rod 22. Owing to the fact that the sapphire strain sensitive element is an element of an elongated cantilevered beam, a relatively small difference in pressures can cause appreciable beam travel without overstressing the strain sensitive element 14.

In a situation in which there is an overload pressure, in one case, the capsule 24 collapses, and thus limits the movement of tube 16 before the element 14 is overstressed. Similarly, an overload pressure on the lower diaphragm 32 causes it to rest against a conforming surface in the block 10, again limiting the movement of the tube 16 before the element 14 is overstressed. It should also be noted that, in some cases, the element 14 may comprise a silicon slab into which a resistive pattern has been diffused.

Figure 3:
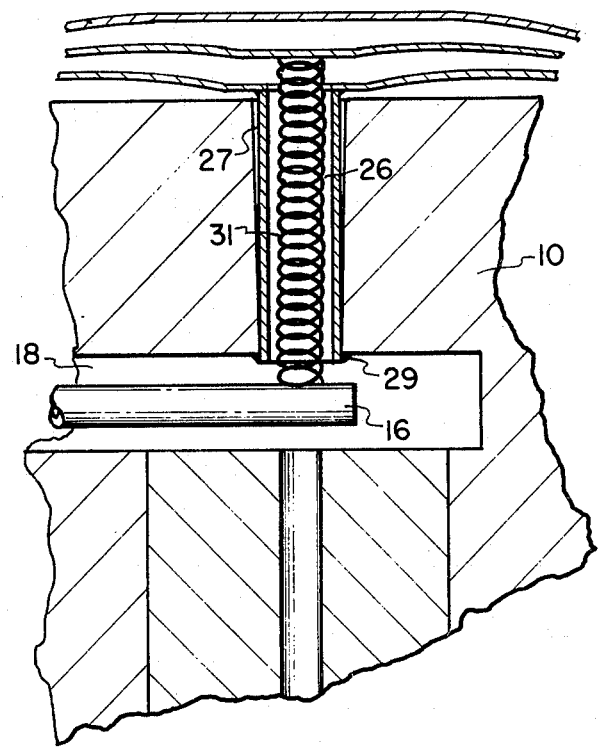
FIG. 3 is a detail fragmentary view showing the attachment of the capsule diaphragm to the material body and also showing an alternative embodiment for securing the capsule to the beam.

It should be noted that the transducer is symmetrical with respect to a horizontal center line of the body 10. This symmetry tends to minimize the relative movement of the component parts due to the effects of temperature which produces an expansion or contraction of the parts, particularly in the plane of the transducer slab 14. The arrangement shown in detail in FIG. 3 further tends to minimize such effects caused by temperature. Referring now to FIG. 3, it should be noted that the sleeve 27 which connects the capsule 24 to the block 10 is welded only around its periphery 29 adjacent to the end of the beam extender 16. The sleeve 27 is otherwise free to move relative to the block 10 so that by choosing a material which has the same coefficient of expansion as the tube 16 any differential expansion can be minimized. It should be noted that, in any case, the materials for the tube 16 and the sleeve 27 should be chose to have as low a coefficient of expansion as possible. Stainless steel is a suitable material. In order to provide overload protection without the need for machining the surfaces of the block 10 to critical dimensions, an open coil spring 31 can be used in place of the rod 22. In this configuration, the passage 18 in which the beam extender tube 16 is disposed can be machined to a critical tolerance to allow the tube 16 to contact the upper or lower interior surface of the passageway 18 in the event of overload prior to overstressing the beam. Any additional motion caused by the overload before the diaphragm on the high pressure side seats can then be absorbed by the open coil spring 31.

Thus, it will be appreciated that the instant invention provides a simple, low cost assembly for differential pressure transducing applications particularly low differential pressures in severe ambient conditions.

The embodiments of the invention in which an exclusive property or privilege is claimed are defined as follows:

1. A differential pressure to current transducer comprising in combination:
   a transducer housing;
   a strain sensitive element including a resistive pattern on a slab which has high modulus of elasticity;
   a header secured in said housing;
   a rigid beam extender embedded in and secured to one end of said slab, said beam extender at least eight times as long as said slab;
   the other end of said slab embedded in and secured to said header with said beam extender and slab in combination forming an extended cantilever beam;
   a pair of diaphragms secured to said housing, at least one of said diaphragms being a capsule;
   a fluid passage in said housing coupling a pressure exerted on one diaphragm to the other diaphragm; and
   means coupling an interior wall of said capsule to said rigid beam extender, whereby movement of the wall causes movement of said beam extender and a change in the resistive values of said resistive pattern.

2. A differential pressure to current transducer comprising in combination:
   a transducer housing;
   a strain sensitive element including a silicon resistive pattern on a sapphire slab;
   a header secured in said housing;
   a rigid beam extender embedded in and secured to one end of said sapphire slab, said beam extender at least eight times as long as said slab;

the other end of said sapphire slab embedded in and secured to said header with said beam extender and slab in combination forming an extended cantilever beam;

a pair of diaphragms secured to said housing, at least one of said diaphragms being a capsule;

a fluid passage in said housing coupling a pressure exerted on one diaphragm to the other diaphragm; and means coupling an interior wall of said capsule to said rigid beam extender, whereby movement of the wall causes movement of said beam extender and a change in the resistive values of said resistive pattern.

3. A differential pressure to current transducer as in claim 2 wherein said means coupling an interior wall of said capsule to said beam extender is a spring.

4. A differential pressure to current transducer comprising in combination:

a transducer housing;

a strain sensitive element including a resistive pattern on a slab which has a high modulus of elasticity;

a header secured in said housing;

a rigid beam extender secured to one end of said slab;

the other end of said slab embedded in and secured to said header with said beam extender and slab in combination forming an extended cantilever beam;

a pair of diaphragms secured to said housing;

a fluid passage in said housing coupling a pressure exerted on one diaphragm to the other diaphragm;

a sleeve attached to one of said diaphragms, said sleeve extending into a part of said fluid passage and attached to said housing at a point adjacent said beam extender means so that said sleeve and said diaphragm can move relatively to said housing except at said point of attachment; and means coupling one of said diaphragms to said rigid beam extender, whereby movement of said diaphragm causes movement of said beam extender and a change in the resistive values of said resistive pattern.

5. A differential pressure to current transducer as in claim 4 wherein said means coupling one of said diaphragms to said beam extender is a spring.

* * * * *